United States Patent [19]

Deeg et al.

[11] 3,811,857

[45] May 21, 1974

[54] METHOD FOR FIRE POLISHING OPTICAL GLASS LENSES WITH PLASMA FLAMES

[76] Inventors: Emil W. Deeg, R. R. 2, Box 221, Woodstock, Colo. 06281; Carl G. Silverberg, Willard Rd.; Leslie B. Martel, New Boston Rd., both of Sturbridge, Mass. 01566

[22] Filed: June 15, 1973

[21] Appl. No.: 370,248

Related U.S. Application Data

[63] Continuation-in-part of Ser. No. 201,596, Nov. 17, 1971, abandoned.

[52] U.S. Cl............... 65/65 R, 65/104, 65/120, 65/284, 313/321
[51] Int. Cl.................................... C03b 29/04
[58] Field of Search............ 65/65 R, 104, 120, 269, 65/284; 313/321

[56] References Cited
UNITED STATES PATENTS
1,383,171   6/1921   Sunder................................ 65/284
2,608,031   8/1952   Barnes et al. .................... 65/65 R X
2,922,869   1/1960   Giannini et al. ................. 313/231 X
3,252,779   5/1966   Rexford.............................. 65/120
3,531,272   9/1970   Menear............................ 65/104 X FOREIGN PATENTS OR APPLICATIONS
903,473   8/1962   Great Britain..................... 313/231

*Primary Examiner*—Robert L. Lindsay, Jr.
*Attorney, Agent, or Firm*—W. C. Nealon

[57] ABSTRACT

Flame polished lenses for spectacles and instruments are provided. Surfaces exhibit profiles of a quality equivalent or superior to mechanically polished lenses by use of a high frequency plasma torch. The torch flame is characterized by extremely high temperature, short wavelengths of maximum emission energy combined with low gas flow rate.

11 Claims, 4 Drawing Figures

PATENTED MAY 21 1974　　3,811,857

INVENTOR.
EMIL W. DEEG
BY CARL G. SILVERBERG
LESLIE B. MARTEL

ATTORNEY

METHOD FOR FIRE POLISHING OPTICAL GLASS LENSES WITH PLASMA FLAMES

CROSS-REFERENCES TO RELATED APPLICATIONS

This application is a continuation-in-part of our co-pending application Ser. No. 201,596, filed Nov. 17, 1971, now abandoned.

BACKGROUND OF THE INVENTION

Optical quality glass lenses for spectacles or optical instruments are produced presently by grinding or diamond machining a predetermined surface and subsequently mechanically polishing the thus generated surface. By "optical quality" we mean of a quality sufficient for ophthalmic lenses. For a more detailed, technical description of many of the requirements of an "optical quality" see "Optical Glassworking" by F. Twyman, published by Hilger & Watts Limited of London in 1955; see in particular pages 154 et seq. This process is time consuming and requires special tooling for both the generating and polishing procedure. In addition, it is difficult and costly to polish precision aspherical surfaces which can be generated by diamond machining.

It has been known that fire polished, smooth glass surfaces can be achieved by techniques such as blowing, casting, pressing or drawing viscous glass. However, none of these techniques yielded a lens of the quality and precision required for ophthalmic lenses, including safety lenses and high quality sunglasses, nor lenses needed in precision optical instruments.

Numerous attempts have been made to produce fire polished surfaces on ground glass lenses by heating the surface above the softening point of the glass by means of flame torches such as oxygen/hydrogen flame and direct current plasma torches. These experiments have not been successful for at least two reasons: (a) the flame temperature was too low to melt a thin enough surface layer of the ground lens substantially without causing mechanical distortion, (b) the velocity of the gas used as the energy carrier was so high that the thin molten surface layer was deformed by fluid-mechanical forces acting upon it.

OBJECTS OF THE INVENTION

It is thus an object of this invention to provide a satisfactory method of fire polishing optical quality glass surfaces.

It is another object of the invention to provide a method of relatively inexpensively and rapidly producing optical quality glass ophthalmic lenses without mechanical polishing.

It is yet another object of the invention to provide optical quality, precision glass lenses for spectacles and instruments.

THE DRAWINGS

Figure 2:
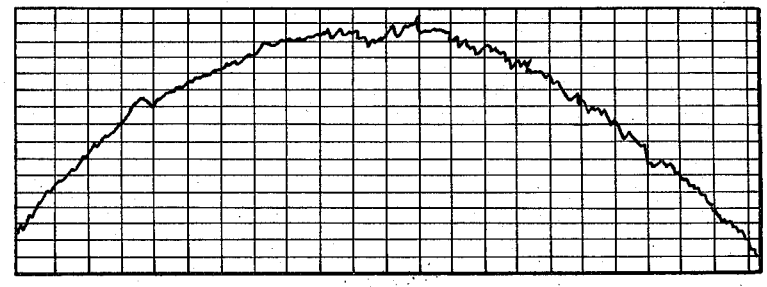
FIG. 2 is a profile of a diamond generated lens surface.
Figure 3:
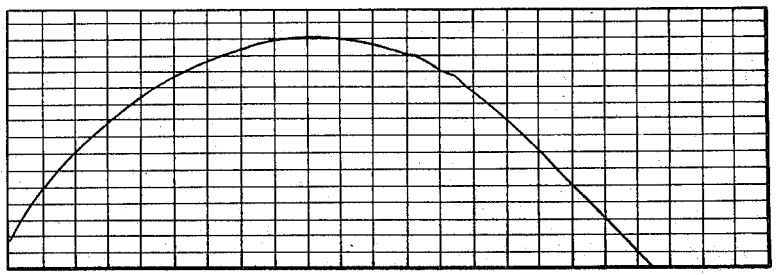
FIG. 3 is a profile of a mechanically polished ophthalmic lens surface.
Figure 4:
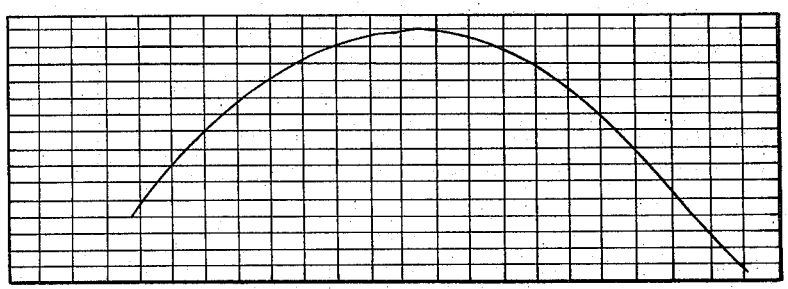
FIG. 4 is a profile of an ophthalmic lens surface polished according to the present invention.

(In FIGS. 2, 3 and 4, the abscissa is in units of $10^{-2}$ inches (= 254um) and the ordinate is in units of $10^{-4}$ inches (2.54um).

BRIEF DESCRIPTION OF THE INVENTION

It has been found that curved and flat surfaces of glass bodies, such as glass lenses with rough surfaces generated by grinding or diamond machining can be polished very econimically within a few seconds by exposing these surfaces to the intense heat produced by a high frequency plasma torch. Of special advantage is the extremely high temperature of the flame of such a torch, and the short wavelength of its maximum emission energy combined with a very low flow rate of the energy carrying gas. Generally, flame temperatures of high frequency plasma torches are in the order of 5,000° to 27,000° C. Suitable flame temperatures of such high frequency plasma torches may vary considerably in practicing the present invention. Fire polishing of lenses using flame temperatures in the upper portion of the range is generally conducted with plasma torches having higher gas flow rates as well as passing the glass bodies to be polished through the flame more rapidly. Flame temperature, gas flow velocities and the duration of exposure to the high frequency plasma flame are inter-related factors which are not independently critical and may be varied over substantially wide margins. The criteria for selecting the correct combination is a flame temperature and gas velocity in combination with a duration of exposure that melts the glass surface to a depth just sufficient to eliminate the deepest pit or fissure in the ground or generated surface. It is usually sufficient to melt a surface layer to a depth of 10 to 100 microns. Melting a layer to a depth of 40 to 75 microns is generally sufficient for most ophthalmic lenses and elements for scientific instruments. In fire polishing larger glass bodies such as projector lenses which may have a diameter of 6 inches or more, it may be desirable to melt a surface thickness as great as 250 microns. A determination of the maximum surface depth that any glass body may be melted depends on the thickness of the body which controls permanent distortion resulting from such melting and the viscosity of the glass at the treatment temperature. Treatment temperature as used herein means the temperature of a significant portion of the glass surface, and is related to, but not identical to the torch flame temperature. When the glass has a low viscosity at treatment temperature, it is essential that the body remain at such temperature for a short time, i.e., 8 seconds or less, particularly in the presence of the gas being directed thereon from the high frequency plasma torch to prevent displacement of the melted surface and distortion of the lens. In practicing the present invention, one can extend the duration of exposure to the high frequency plasma flame or increase the gas velocity when the treatment temperature does not produce a low viscosity in the melted surface. A highly viscous glass surface, even though exposed to higher flame temperatures and gas velocities, will not be displaced by the gas force for a limited period of time due to its resistance to flow. When the glass has a relatively low viscosity at the treatment temperature, it is necessary to pass the same more rapidly through the high frequency plasma flame and to use lower gas velocities, since the lower viscosity will permit more rapid displacement of the glass surface by the forces of the gas thereon.

Since most clear silicate glasses, e.g., such as ophthalmic crown glasses have a maximum absorption at wavelengths in the order of approximately 290nm, high frequency plasma torches having a maximum emissivity of the same wavelength are suitable for most optical fire polishing. However, certain glasses having a maximum absorption wavelength differing substantially from 290nm would most effectively be polished by a high frequency plasma flame having a maximum emissivity of the same wavelength as the maximum absorption of the glass.

Suitable gas velocities passing through high frequency plasma torches used in practicing the present invention range from approximately 20 feet per second (= 6.096 m/sec) up to approximately 200 feet per second (= 60.96 m/sec). In most applications, a gas velocity that does not exceed 100 feet per second is used. Plasma flames in the order of 10,000° to 15,000° C are generally preferred and, with such flames, gas velocities will usually range from 30 to 100 feet per second ($\approx$ 9 to 31 m/sec). With usual flame temperatures and gas velocities it has been found that exposure may extend from 4 seconds up to approximately one-half minute without producing significant surface displacement or permanent distortion, depending on the particular glass characteristics, the treatment temperature and the thickness of the glass body being treated.

DETAILED DESCRIPTION OF THE INVENTION

Before one can understand adequately the present invention, it is thought some discussion of certain properties of flames will be useful. In Table A certain comparative properties are reported:

TABLE A

Selected Properties of Flames (a) heat source; (b) approximate flame temperature; (c) equivalent maximum emission wavelength for black flame; (d) typical gas velocity of energy carrier.

| (a) | (b) in degr. C | (c) in nm | (d) in ft./sec. |
|---|---|---|---|
| Oxygen/Hydrogen Flame | 2600 | 980 | 300 |
| DC Plasma Torch | 5,000 | 550 | 1,800 |
| High Frequency Plasma Torch | 10,000 | 290 | 30 |

A plasma torch or jet is an electric arc-gas device in which gases can be heated to extremely high temperatures without involving combustion. An electric arc which can be either sustained by direct current (dc plasma torch) or by a high frequency electromagnetic field (high frequency plasma torch) is contained within a small tube through which gas is blown. The highly ionized gas issuing from a high frequency plasma torch somewhat resembles an open welding flame. Although the term "plasma" is used in describing the flame, it is not a true "plasma." According to the generally accepted definition, a "plasma" is a gas in which the molecules have been completely dissociated and are ionized. In most cases, the gas of a high frequency plasma torch is neither completely dissociated nor completely ionized.

The elevated flame temperature of the high frequency plasma torch of the type needed according to the present invention has a temperature of at least 5,000° C and preferably 7,000° C which permits melting of a glass surface at least to the depth of optically significant apertures within a very short time. The relatively low maximum emission wavelength of 290nm causes almost complete absorption of the radiant energy of the flame by the surface of the lens (even if made of fused silica which absorbs enough energy at this wavelength to be polished) and the low flow rate of the energy carrying gas avoids unwanted distortion of the surface.

A device used for the experiments described below is shown schematically in FIG. 1. Electrical energy is transferred to the gas (preferably air) from a high frequency generator by induction: thus the names "induction plasma" or "high frequency plasma." Such equipment is readily available on the market. For example, we prefer a 50 kw supply, and the "Model 66" torch of the TAFA Division of the Humphreys Corporation. Other gases which may be used include argon, nitrogen, mixtures of nitrogen and oxygen. This list is not exhaustive of all gases and mixtures thereof which are used.

Figure 1:
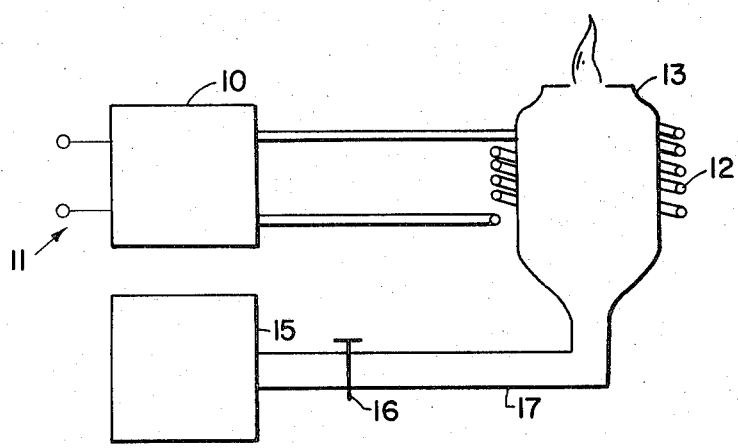
FIG. 1 is a schematic diagram of apparatus useful in the practice of the present invention.

In FIG. 1 there is shown a high frequency generator 10 suitably interconnected between an AC input 11 and an induction coil 12 about the torch chamber 13. Gas supply 15 is interconnected through a valve 16 and tubing 17 with the torch chamber 13.

Example I

A flat plate of fused silica, 3mm thick, 25mm wide and 25mm long, with one of the large surfaces ground with 10 micron size emery was supported by a refractory brick and steadily moved at a rate of approximately 2mm/sec. through a high frequency air plasma torch flame produced by a 30 kw, 4 MHz high frequency plasma generator. The ground surface was exposed to the heat of the plasma torch for a total of about 15 sec. After cooling to room temperature the surface smoothness was measured with a Bendix Proficorder and the results compared with the smoothness of the surface of mechanically polished plate glass and to the smoothness of plate glass made by the float glass process. The smoothness of the three surfaces was comparable. The thickness of the layer of melted glass was less than 100 microns.

Example II

An optical quality ophthalmic crown glass lens blank with ground surface having a surface profile as shown in FIG. 2 was supported by a refractory brick and exposed to the heat of a 50 kw 4MHz high frequency air plasma torch flame for approximately 5 sec. After this the lens was cooled to about 200° C and annealed. It was then removed from the annealing furnace and cooled to room temperature (about 25° C). The surface smoothness was then measured with a Bendix Proficorder. FIG. 4 shows the recorded surface profile. It compares favorably with the smoothness of a mechanically polished lens surface as shown in FIG. 3.

Example III

A plano optical quality ophthalmic crown glass lens blank with one surface mechanically polished, the other surface diamond generated, was held by suction at the end of a tube of dense alumina with the mechanically polished surface facing the holding tube. The thus mounted lens was preheated in a small cylindrical electric furnace to a temperature of approximately 425° C. Subsequently, the mounted, preheated lens was placed in the hot zone of a high frequency air plasma torch flame operated at 4 MHz with a total electrical input of 42 kW. The lens was left in the flame for a period of 8 sec. and while there, rotated at approximately 120 revolutions per minute. The lens was annealed in an annealing furnace according to the following schedule:

| Time in min. | 0 | 5 | 10 | 15 | 20 | 25 | 30 | 40 | 50 | 60 |
|---|---|---|---|---|---|---|---|---|---|---|
| Temperature in degr. C. | 538 | 507 | 488 | 471 | 460 | 449 | 441 | 424 | 410 | 399 |

The lens was removed from the annealing furnace and cooled to room temperature (approximately 25° C). The gas (air) flow rate was 240 SCFH (standard cubic feet per hour) (= 6.792 m³/hour). The thickness of the surface-layer of glass melted was approximately 50 microns. The lens was stress free and the melted layer substantially uniform in thickness.

Example IV

A plano optical quality ophthalmic crown glass lens blank with one surface mechanically polished, the other surface diamond generated, was held in a cast iron holder with the generated surface exposed. The thus mounted lens was preheated in a small rectangular furnace containing six fused quartz infrared heaters to a temperature of approximately 900° F (480° C). Subsequently, the mounted, preheated lens was placed on a motor driven spindle and delivered to the hot zone of a high frequency air plasma torch flame at 4 MHz with a total electrical input of 42 KW. The torch itself was oriented at a 30° angle off the horizontal plane with the opening in the third quadrant. The lens was exposed to the flame for a period of 9 seconds and while there, rotated at approximately 120 RPM. The lens was annealed in an annealing oven as described in Example III.

Example V

The following types of lens blanks were exposed to the flame of a high frequency air plasma torch at 4 MHz with a total electrical input of 44 KW.

An emery fined lens blank with spherical front surface,

An emery fined lens blank with cylindrical front surface,

A diamond generated lens blank with spherical front surface,

A diamond milled lens blank with spherical front surface,

A diamond lapped lens blank with spherical front surface,

A diamond generated lens blank with cylindrical surface. The minus curve of these lenses were in the molded state.

These lenses were mounted in a single cast iron holder having a curve matching the minus curve on the lens blanks. The mounted lens was preheated in a rectangular furnace containing six fused quartz infrared heaters to a temperature range of 900° F to 1,280° F (480° C to 690° C) depending upon the heat capacity of the lens, those with higher heat capacity requiring higher temperature. Subsequently, the mounted lens was placed on a spindle that was capable of traveling in a planetary motion while the lens was exposed to the plasma flame for periods ranging from 4 to 12 seconds. The axial movement of the planetary motion was approximately 100 RPM, while the radial movement was approximately 120 RPM. The lens was then annealed according to the schedule of Example III.

Example V represents the best mode now known for the practice of the invention. While the preferred thickness of melted surface layer is 50 microns, the range is approximately 10 to 100 microns, depending on the roughness of the original surface before flame polishing.

In essence, the method of the present invention is comprised of preparing a lens, either blank or finished, of optical quality without mechanical polishing. One surface of such a blank or lens can have optical smoothness as the result of casting on a mold, mechanical polishing, or perhaps previous flame polishing, for example. The other surface opposed from the molding surface may or may not be subject to a grinding operation before being subjected to the flame polishing procedures of the present invention.

In the preferred embodiment, the blank or lens is subjected to flame polishing while supported on a rotating surface. Planetary movement, i.e., circular movement of a rotating lens, is particularly desirable to provide uniform heating. One should realize that other types of surfaces can be used. For example, a moving conveyer belt could be used, or a stationary surface. The conveyer belt would of necessity be sufficiently refractory to resist the high temperature atmosphere to which it might be exposed.

In the broadest aspect of the invention, the unfinished non-optical quality surface of the lens or blank is subjected to the high frequency plasma torch flame for a time period sufficient to melt a substantially uniform, but extremely thin, layer of glass over substantially its entire surface. The layer is sufficiently thin and is done at such a rapid speed that neither mechanical distortion through the body of the lens nor significant displacement of the melted surface layer occurs.

What is claimed is:

1. The method of manufacturing an optical quality lens comprising the steps of preparing a lens of optical quality glass having an unfinished surface; placing said lens on a support so as to expose said unfinished surface; and heating said unfinished surface with a high frequency plasma torch having a flame temperature of at least 5,000° C at a gas velocity of 20 to 200 feet per second for a time interval sufficient to melt a substantially uniform layer of glass to a depth of the deepest fissure of said unfinished surface substantially without displacement of the melted layer of glass and substantially without inducing distortion in said lens to polish said unfinished surface.

2. The method of claim 1 wherein said lens is annealed after the unfinished surface is polished.

3. The method of claim 2 wherein said section of melted glass has a depth of at least 10 microns.

4. The method of claim 2 wherein said melted glass layer has a depth between approximately 10 and 100 microns and said gas velocity is 20 to 100 feet per second.

5. The method of claim 4 wherein said section of melted glass has a depth of about 40 to 75 microns.

6. The method of claim 1 wherein said unfinished surface is rotated during heating by said high frequency plasma torch flame.

7. The method of claim 1 wherein the unfinished surface is moved in a planetary motion during heating by said high frequency plasma flame.

8. The method of claim 2 wherein said lens is first preheated to a temperature capable of at least partially releasing stresses in said lens.

9. The method of claim 3 wherein said plasma torch has a flame temperature of at least approximately 5,000° C, maximum emissivity at about 290 nanometers and a gas velocity not substantially exceeding 100 feet per second.

10. The method of claim 5 wherein said plasma torch has a flame temperature of about 10,000° to 15,000° C.

11. The method of claim 10 wherein the lens is preheated to a temperature capable of at least partially relieving stresses therein prior to heating with the plasma torch and said lens is rotated during heating with said plasma torch.

* * * * *